US011196049B2

(12) United States Patent
Ota

(10) Patent No.: US 11,196,049 B2
(45) Date of Patent: Dec. 7, 2021

(54) COATED LITHIUM-NICKEL COMPOSITE OXIDE PARTICLES, AND METHOD FOR PRODUCING COATED LITHIUM-NICKEL COMPOSITE OXIDE PARTICLES

(71) Applicant: SUMITOMO METAL MINING CO., LTD., Tokyo (JP)

(72) Inventor: Yosuke Ota, Chiba (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 16/529,570

(22) Filed: Aug. 1, 2019

(65) Prior Publication Data

US 2019/0355989 A1 Nov. 21, 2019

Related U.S. Application Data

(62) Division of application No. 15/314,734, filed as application No. PCT/JP2015/064475 on May 20, 2015, now abandoned.

(30) Foreign Application Priority Data

May 30, 2014 (JP) .................................. 2014-112651

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/42* (2013.01); *C08K 3/22* (2013.01); *C08K 9/10* (2013.01);
(Continued)

(58) Field of Classification Search
CPC .. C01G 53/42; C01P 2004/32; C01P 2004/61; C01P 2006/40; C08K 2003/2203;
(Continued)

(56) References Cited

U.S. PATENT DOCUMENTS 6,174,623 B1  1/2001 Shackle
6,177,181 B1  1/2001 Hamada
(Continued)

FOREIGN PATENT DOCUMENTS

CN    1214710 A    4/1999
CN  103828102 A    5/2014
(Continued)

OTHER PUBLICATIONS

Office Action of European Patent Application No. 15799658.8 dated Sep. 21, 2018 (7 pages).
(Continued)

*Primary Examiner* — Stewart A Fraser
*Assistant Examiner* — Lilia Nedialkova
(74) *Attorney, Agent, or Firm* — Kratz, Quintos & Hanson, LLP

(57) ABSTRACT

Provided are excellent coated lithium-nickel composite oxide particles with which it is possible, due to the high environmental stability thereof, to minimize the incidence of impurities owing to absorption of moisture and carbon dioxide gas, said particles having high adhesiveness such that the coating layer does not easily delaminate, and having lithium-ion conductivity. The coated lithium-nickel composite oxide particles, in which an electroconductive polymer is cross-linked to the lithium-nickel composite oxide particles by a three-dimensional structure, are electrically and ionically conductive, and the compound is capable of suppressing the transmission of moisture and carbon dioxide. It is therefore possible to provide coated lithium-nickel compos-
(Continued)

ite oxide particles for a lithium-ion cell positive-electrode active substance that is excellent for use in a lithium-ion cell.

1 Claim, 4 Drawing Sheets

(51) Int. Cl.
*C08K 3/22* (2006.01)
*H01M 4/62* (2006.01)
*H01M 4/36* (2006.01)
*H01M 4/02* (2006.01)
*H01M 4/505* (2010.01)
*C08K 9/10* (2006.01)
*H01M 10/0525* (2010.01)

(52) U.S. Cl.
CPC ........... *H01M 4/505* (2013.01); *H01M 4/624* (2013.01); *H01M 10/0525* (2013.01); *C01P 2004/32* (2013.01); *C01P 2004/61* (2013.01); *C01P 2006/40* (2013.01); *C08K 2003/2203* (2013.01); *C08K 2003/2227* (2013.01); *C08K 2003/2293* (2013.01); *C08K 2201/001* (2013.01); *C08K 2201/003* (2013.01); *H01M 4/366* (2013.01); *H01M 2004/021* (2013.01); *H01M 2004/028* (2013.01)

(58) Field of Classification Search
CPC .... C08K 2003/2227; C08K 2003/2293; C08K 2201/001; C08K 2201/003; C08K 3/22; C08K 9/10; H01M 10/0525; H01M 2004/021; H01M 2004/028; H01M 4/366; H01M 4/505; H01M 4/525; H01M 4/624; Y02E 60/10

See application file for complete search history.

(56) References Cited

U.S. PATENT DOCUMENTS

2009/0194747 A1 8/2009 Zou
2011/0065003 A1 3/2011 Chang
2012/0107686 A1 5/2012 Ryu
2012/0261610 A1 10/2012 Paulsen
2013/0142943 A1* 6/2013 Kubo .................. H01M 4/1397
427/58
2014/0106217 A1* 4/2014 Lee ....................... H01M 4/622
429/217
2014/0356716 A1 12/2014 Kitagawa
2015/0099167 A1 4/2015 Oshima
2016/0079601 A1 3/2016 Yoshitake

FOREIGN PATENT DOCUMENTS

| JP | H11-329415 A1 | 11/1999 |
| JP | 2004-273055 A | 9/2004 |
| JP | 2008-078491 A | 4/2008 |
| JP | 2011-071074 A1 | 4/2011 |
| JP | 2011-511402 | 4/2011 |
| JP | 2011-228222 A | 11/2011 |
| JP | 2013-012410 A | 1/2013 |
| JP | 2013-179063 A1 | 9/2013 |
| JP | 2014-096343 A1 | 5/2014 |
| WO | 2014/185460 A1 | 11/2014 |

OTHER PUBLICATIONS

Office Action of Chinese Patent Application No. 201580028043.3 dated Nov. 5, 2018 (5 pages).
Extended European Search Report for European Patent Application No. 15799658.8 dated Oct. 11, 2017 (9 sheets).
Chung, et al.; "Surface Coating and Electrochemical Properties of $LiNi_{0.8}Co_{0.15}Al_{0.05}O_2$/Polyaniline Composites as an Electrode for Li-ion Batteries"; Bull. Korean Chem. Soc.; vol. 30; No. 8; Aug. 1, 2009; pp. 1733-1737 (5 sheets)/Cited in Extended European Search Report dated Oct. 11, 2017 for EP App. No. 15799658.8.
International Search Report for International Application No. PCT/JP2015/064475 dated Aug. 11, 2015 (2 sheets).
Machine Translation of Japanese Patent Publication No. 2013/012410 (A); by Imaizumi, Junichi, et al.; published Jan. 17, 2013 (12 sheets).

* cited by examiner

US 11,196,049 B2

COATED LITHIUM-NICKEL COMPOSITE OXIDE PARTICLES, AND METHOD FOR PRODUCING COATED LITHIUM-NICKEL COMPOSITE OXIDE PARTICLES

TECHNICAL FIELD

The present invention relates to coated lithium-nickel composite oxide particles with a high content of nickel, and also relates to coated lithium-nickel composite oxide particles of which the stability under the atmosphere is improved and which is easy to handle, and a method for producing the coated lithium-nickel composite oxide particles.

BACKGROUND ART

In recent years, along with the rapid expansion of small-sized electronic devices such as cellular phones and laptop computers, a demand for a lithium-ion secondary battery as a chargeable and dischargeable power source has been rapidly increased. A lithium-cobalt oxide (hereinafter, sometimes also referred to as cobalt-based) has been widely used as a positive-electrode active substance contributing to the charging and discharging in a positive electrode of a lithium-ion secondary battery. However, capacity of the cobalt-based positive electrode has improved to the extent of theoretical capacity through the optimization of battery design, and higher capacity is becoming difficult to achieve.

Accordingly, lithium-nickel composite oxide particles using a lithium-nickel oxide that has the theoretical capacity higher than that of the conventional cobalt-based one has been developed. However, the pure lithium-nickel oxide has a problem in terms of safety, cycle characteristics, and the like because of the high reactivity with water, carbon dioxide, or the like, and is difficult to be used as a practical battery. Therefore, lithium-nickel composite oxide particles to which a transition metal element such as cobalt, manganese, and iron, or aluminum has been developed as an improvement measure for the problem described above.

In the lithium-nickel composite oxide, there are composite oxide particles expressed by a transition metal composition of $Ni_{0.33}Co_{0.33}Mn_{0.33}$, a so-called ternary composite oxide (hereinafter, sometimes referred to as ternary), which is made by adding nickel, manganese, and cobalt in an equimolar amount, respectively, and lithium-nickel composite oxide particles with a nickel content exceeding 0.65 mol, a so-called nickel-based composite oxide (hereinafter, sometimes referred to as nickel-based). From the viewpoint of capacity, a nickel-based with a large nickel content has a great advantage as compared to a ternary.

However, the nickel-based is characterized by being more sensitive depending on the environment as compared to a cobalt-based or a ternary, because of the high reactivity with water, carbon dioxide, and the like, and absorbing moisture and carbon dioxide ($CO_2$) in the air more easily. It has been reported that the moisture and carbon dioxide are deposited on particle surfaces as impurities such as lithium hydroxide (LiOH), and lithium carbonate ($Li_2CO_3$), respectively, and have an adverse effect on the production process of a positive electrode or battery performance.

By the way, the production process of a positive electrode passes through a process in which a positive electrode mixture slurry obtained by mixing lithium-nickel composite oxide particles, a conductive auxiliary, a binder, an organic solvent, and the like is applied onto a collector made of aluminum or the like, and dried. In general, in the production process of a positive electrode mixture slurry, lithium hydroxide causes the slurry viscosity to increase rapidly by reacting with a binder, and may cause gelation of the slurry. These phenomena cause faults and defects, and a decrease of production yield of a positive electrode, and may cause a variation in quality of the products. Further, during charging and discharging, these impurities react with an electrolytic solution and sometimes generate gas, and may cause a problem in the stability of the battery.

Accordingly, in a case where a nickel-based is used as a positive-electrode active substance, in order to prevent the generation of impurities such as the above-described lithium hydroxide (LiOH), the production process of a positive electrode is required to be performed in a dry (low humidity) environment in a decarbonated atmosphere. Therefore, there is a problem that in spite of having high theoretical capacity and showing great promise as a material of a lithium-ion secondary battery, the nickel-based requires high cost for the introduction of a facility and high running costs for the facility in order to maintain the production environment, and which becomes a barrier to it becoming widespread.

In order to solve the problem described above, a method of coating surfaces of lithium-nickel composite oxide particles by using a coating agent has been proposed. Such a coating agent is roughly classified as an inorganic coating agent and an organic coating agent. As the inorganic coating agent, a material such as titanium oxide, aluminum oxide, aluminum phosphate, cobalt phosphate, fumed silica, and lithium fluoride have been proposed, and as the organic coating agent, a material such as carboxymethyl cellulose, and a fluorine-containing polymer have been proposed.

For example, in Patent Document 1, a method of forming a lithium fluoride (LiF) or fluorine-containing polymer layer on surfaces of lithium-nickel composite oxide particles has been proposed, and in Patent Document 2, a method of forming a fluorine-containing polymer layer onto lithium-nickel composite oxide particles, and further adding a Lewis acid compound to neutralize impurities has been proposed. In any processing, lithium-nickel composite oxide particles are modified so as to have the hydrophobic property with a coated layer containing a fluorine-based material, and the adsorption of moisture is suppressed, and the deposition of impurities such as lithium hydroxide (LiOH) can be suppressed.

However, the coated layer containing a fluorine-based material used for the coating does not have electrical conductivity. Accordingly, even though the deposition of the impurities can be suppressed, the coated layer itself becomes an insulator, and causes an increase in positive electrode resistance and a decrease in battery characteristics. Therefore, there has been a problem in that the quality of the lithium-nickel composite oxide particles itself is lowered.

Patent Document 1: Japanese Unexamined Patent Application, Publication No. 2013-179063

Patent Document 2: Japanese Unexamined Patent Application (Translation of PCT Application), Publication No. 2011-511402

DISCLOSURE OF THE INVENTION

Problems to be Solved by the Invention

In view of the above-described problems of conventional technique, an object of the present invention is to provide coated lithium-nickel composite oxide particles that can be handled in the atmosphere and can obtain coated films of a lithium ion conductor, the coated films not having an adverse effect on battery characteristics, and a method for producing the coated lithium-nickel composite oxide particles.

Means for Solving the Problems

As a result of intensive studies to solve the above-described problems of conventional technique, the present inventors have found that by coating surfaces of nickel-based lithium-nickel composite oxide particles with a conductive polymer having both electrical conductivity and ion conductivity, the increase of the positive electrode resistance and a decrease in the battery characteristics due to the coating can be prevented. Further, as for the coated lithium-nickel composite oxide particles, the coated layer does not peel off from the particle surfaces even when a positive electrode mixture slurry is kneaded. Furthermore, the present inventors have found suitable coated lithium-nickel composite oxide particles that can suppress the generation of impurities caused by moisture and carbon dioxide in the air, and can be handled in the atmosphere during the handing of materials, during transportation, during storage, during the preparation of electrodes and the production of batteries, and a method for producing the coated lithium-nickel composite oxide particles; and thus have completed the present invention.

That is, a first aspect of the present invention is coated lithium-nickel composite oxide particles for a lithium-ion battery positive-electrode active substance, including nickel-based lithium-nickel composite oxide particles, surfaces of which are coated with a conductive polymer.

A second aspect is the coated lithium-nickel composite oxide particles according to the first aspect of the invention, in which a coating amount of the conductive polymer is from 0.1 to 5.0% by mass based on 100% by mass of the lithium-nickel composite oxide.

A third aspect is the coated lithium-nickel composite oxide particles according to the first or second aspect of the invention, in which the conductive polymer is a polymer or copolymer including at least one selected from the group consisting of polypyrrole, polyaniline, polythiophene, poly(p-phenylene), polyfluorene, and a derivative thereof.

A fourth aspect is the coated lithium-nickel composite oxide particles according to any one of the first to third aspects of the invention, in which the lithium-nickel composite oxide is represented by the following Formula (1),

$$Li_xNi_{(1-y-z)}M_yN_zO_2 \quad (1)$$

(in the formula, x is a value of from 0.80 to 1.10, y is a value of from 0.01 to 0.20, z is a value of from 0.01 to 0.15, and 1-y-z is a value exceeding 0.65, and M represents at least one element selected from Co or Mn, and N represents at least one element selected from Al, In or Sn.)

A fifth aspect is the coated lithium-nickel composite oxide particles according to any one of the first to fourth aspects of the invention, in which the coated lithium-nickel composite oxide particles are spherical particles having an average particle diameter of from 5 to 20 μm.

A sixth aspect is a method for producing the coated lithium-nickel composite oxide particles according to any one of the first to fifth aspects of the invention, including: preparing a resin solution for coating by dissolving a conductive polymer into a good solvent that dissolves the resin for coating; adding a poor solvent that does not dissolve a resin for coating and has a boiling point higher than that of the good solvent into the resin solution for coating; adding the lithium-nickel composite oxide into the resin solution for coating to prepare a slurry; and removing the good solvent and the poor solvent sequentially from the slurry.

Effects of the Invention

The present invention is excellent coated lithium-nickel composite oxide particles which have favorable electrical conductivity and lithium ion conductivity on surfaces of lithium-nickel composite oxide particles and are coated with films that can suppress the permeation of moisture and carbon dioxide by producing coated lithium-nickel composite oxide particles having a core of nickel-based lithium-nickel composite oxide particles and a shell including a conductive polymer, and a method for producing the coated lithium-nickel composite oxide particles.

The coated lithium-nickel composite oxide particles can be provided as a high capacity composite oxide positive-electrode active substance for a lithium-ion battery, for which production equipment that has been used for a cobalt-based and ternary can also be used instead of positive-electrode production equipment in which carbon dioxide concentration and moisture concentration are strictly controlled.

PREFERRED MODE FOR CARRYING OUT THE INVENTION

Figure 1:
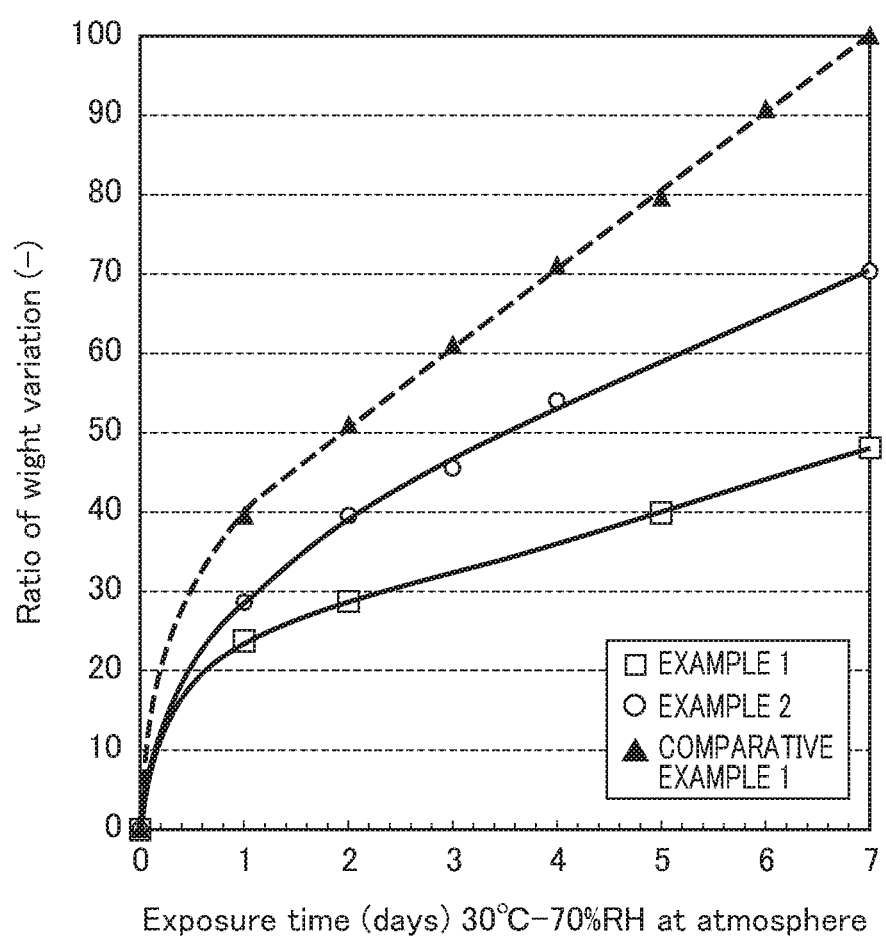
FIG. 1 shows a change rate per particles mass in a case after standing for one week in Examples and Comparative Example.

Hereinafter, coated lithium-nickel composite oxide particles and a method for producing the same, according to the present invention, will be described in detail. However, the present invention should not be construed as being limited to the following detailed explanation. In the present invention, there may be a case where a secondary particle aggregated with primary particles is referred to as lithium-nickel composite oxide particles.

The conductive polymer coating the particle surfaces have favorable electrical conductivity and ion conductivity, therefore, it does not exert an adverse effect on the battery characteristics. Further, the coated lithium-nickel composite oxide particles coated with a conductive polymer are excellent in terms of environmental stability because the conductive polymer serves as the coated layer, and can be handled in a similar facility to that of the cobalt-based or the ternary. Accordingly, the present invention is excellent coated lithium-nickel composite oxide particles having conductivity and environmental stability.

[Conductive Polymer]

The conductive polymer coating the lithium-nickel composite oxide particles according to the present invention is the designation of a high molecular compound having electrical conductivity. This high molecular compound is characterized by having a structure in which a double bond and a single bond are alternately arranged in the molecular structure, that is, having a main chain with developed π conjugation. In general, in addition to the conductive polymer, by doping an acceptor molecule called a dopant or a donor molecule, a carrier is generated, and electrical conductivity is developed. Examples of the dopant include, for example, an alkali metal ion such as $Li^+$, $Na^+$, $K^+$, and $Cs^+$, an alkyl ammonium ion such as tetraethylammonium, halogens, Lewis acid, protons, and a transition metal halide.

The conductive polymer is a polymer in which π conjugation is highly developed as represented by polyacetylene, and does not dissolve in any solvent, does not have a melting point, and has a so-called insoluble and infusible nature. Therefore, the processability is poor and industrial applications have been difficult.

However, according to a recent study, a conductive polymer obtained substantially or apparently as a solution has been developed, as by dissolving the conductive polymer into an organic solvent, by dispersing the conductive polymer into a water solvent, or the like, and thus has been widely used for industrial purposes.

Hereinafter, the present invention will be described in detail by examples. The first example is a method of providing organic solvent solubility or water solubility by directly introducing a substituent into a monomer constituting a conductive polymer. When described specifically, it is known that a polythiophene derivative synthesized from poly-3-alkyl-substituted thiophene to which an alkyl group has been introduced at the 3-position of thiophene is dissolved in an organic solvent such as chloroform, and methylene chloride, and has a melting point before decomposition, that is, is melted and dissolved. Further, a polythiophene derivative synthesized from poly-3-alkyl sulfonic acid thiophene to which alkyl sulfonic acid has been introduced at the 3-position obtains water solubility by a sulfo group that is easy to be blended with water, and can result in self doping at the same time.

Further, the second example is a method of using a water-soluble dopant. By introducing a polymer having a sulfo group that is easy to be blended with water in the molecule together with a dopant and water dispersant the conductive polymer can be finely dispersed in water. When specifically described, a monomer constituting the conductive polymer is subjected to oxidative polymerization in an aqueous solution of a water-soluble polymer. At this time, a conductive polymer is doped with part of the sulfo group having a water-soluble polymer, and further the water-soluble polymer and the conductive polymer are integrated with each other, and a water-soluble conductive polymer is obtained by the remaining sulfo groups. The conductive polymer can be finely dispersed in water at a level of several tens of nm. The representative example is PEDOT/PSS developed by using polystyrene sulfonic acid (PSS), and using 3,4-ethylene dioxythiophene (EDOT) for the conductive polymer monomer.

For example, a polypyrrole-based compound, a polyaniline-based compound, a polythiophene compound, a poly (p-phenylene) compound, a polyfluorene compound, or a derivative thereof can be included as the high molecular compound that can be used in the present invention. Because the present invention passes through a process of dissolving or dispersing a conductive polymer into a solvent, for example, lignin graft type polyaniline or the like in which PEDOT/PSS or lignin has been modified at the end of the polyaniline, and which is enriched in the solubility or the dispersibility, can be preferably used.

Further, the coating amount of the conductive polymer is preferably from 0.1 to 5.0% by mass, and more preferably from 0.2 to 0.5% by mass based on 100% by mass of the nickel-based lithium-nickel composite oxide particles. When the coating amount is less than 0.1% by mass, the processing tends to be insufficient, and when the coating amount exceeds 5.0% by mass, the packing density of particles is lowered by a conductive polymer that is not involved in the particles coating, and an adverse effect may be exerted during the production of positive electrode.

[Nickel-Based Lithium-Nickel Composite Oxide Particles]

The nickel-based lithium-nickel composite oxide particles are spherical particles, and have the average particle diameter preferably of from 5 to 20 μm. When the average particle diameter is set in the range, favorable battery performance is provided as the lithium-nickel composite oxide particles, and further favorable battery repetition life (cycle characteristics) is also provided, both can be achieved, therefore, this is preferred.

In addition, the nickel-based lithium-nickel composite oxide particles are preferably represented by the following Formula (1).

$$Li_xNi_{(1-y-z)}M_yN_zO_2 \quad (1)$$

in the formula, x is a value of from 0.80 to 1.10, y is a value of from 0.01 to 0.20, z is a value of from 0.01 to 0.15, and 1-y-z is a value exceeding 0.65, and M represents at least one element selected from Co or Mn, and N represents at least one element selected from Al, In or Sn.

Further, the value of 1-y-z (nickel content) is, from the viewpoint of the capacity, preferably a value exceeding 0.70, and more preferably a value exceeding 0.80.

The cobalt-based (LCO), the ternary (NCM), and the nickel-based (NCA) have an electrode energy density (Wh/L) of 2160 Wh/L ($LiCoO_2$), 2018.6 Wh/L ($LiNi_{0.33}CO_{0.33}Mn_{0.33}CO_{0.33}O_2$), and 2376 Wh/L ($LiNi_{0.8}Co_{0.15}Al_{0.05}O_2$), respectively. Accordingly, by using the nickel-based lithium-nickel composite oxide particles as a positive-electrode active substance of a lithium-ion battery, a battery having high capacity can be prepared.

[Method for Producing Coated Lithium-Nickel Composite Oxide Particles]

Various methods can be used as a method for producing coated lithium-nickel composite oxide particles, that is, a method for coating nickel-based lithium-nickel composite oxide particles with a conductive polymer that becomes a shell.

For example, a method can be used for the production in which a conductive polymer is dissolved or dispersed in a solvent good for the conductive polymer, and particles are further mixed into the resultant mixture to prepare a slurry, and then a poor solvent is added to the conductive polymer and washed in a stepwise manner, the good solvent is thoroughly removed, and the conductive polymer is deposited on particle surfaces, a so-called phase separation method.

Further, a method in which a conductive polymer that becomes a shell is dissolved or dispersed in a solvent good for the conductive polymer, and particles that become cores are mixed into the resultant mixture to prepare a slurry, into this slurry, a solvent poor for the conductive polymer is added and mixed, and then the good solvent is gradually removed, and the conductive polymer is precipitated on particle surfaces, a so-called interfacial precipitation method, can also be used for the production.

In addition, a method in which particles that become cores are dispersed in a solution in which a conductive polymer has been dissolved or dispersed, and droplets are finely dispersed and sprayed in hot air, a so-called air drying method, or a spray drying method can also be used for the production.

Moreover, a method in which particles that become cores are allowed to flow by a rolling pan, to which a solution in which a conductive polymer has been dissolved or dispersed is sprayed, and the particle surfaces are coated uniformly with the conductive polymer and dried, a so-called pan coating method, can also be used for the production.

Furthermore, a method in which particles that become cores are circulated up and down in a gas blown from the bottom, to which a solution in which a conductive polymer has been dissolved or dispersed is sprayed, so-called a gas suspension coating method, can also be used for the production.

Among them, from the viewpoint of the production cost, the above-described phase separation method can be most preferably used for production.

EXAMPLES

Hereinafter, Examples of the present invention will be specifically described with Comparative Examples. However, the present invention should not be limited to the following Examples.

Example 1

0.1 g of lignin graft type powder, polyaniline (emeraldine salt) manufactured by Sigma-Aldrich Co. LLC was dissolved in 284 g of ethanol to prepare a solution. As nickel-based lithium-nickel composite oxide particles, 50 g of the composite oxide particles represented by the transition metal composition of $Li_{1.03}Ni_{0.82}Co_{0.15}Al_{0.03}$ was placed into this solution, and 16 g of toluene was further added into the resultant mixture and mixed to prepare a slurry. Next, the slurry was transferred to an evaporator, the flask part was placed in a water bath warmed to 45° C. under reduced pressure, and the ethanol was removed while rotating the flask. Subsequently, the preset temperature of the water bath was set to 60° C., and the toluene was removed. Finally, in order to remove the solvent thoroughly, the powder was transferred to a vacuum dryer, and dried at 100° C. for two hours under reduced pressure to prepare processed powder.

By using the particles coated with this polyaniline compound as the coated lithium-nickel composite oxide particles according to Example 1, the following stability test in air, a gelation test, and a battery characteristics test (such as a charge and discharge test, and a cycle test) were performed.

Example 2

0.1 g of PEDOT/PSS (dry re-dispersible pellets) manufactured by Sigma-Aldrich Co. LLC was dissolved in 284 g of ethanol to prepare a solution. As nickel-based lithium-nickel composite oxide particles, 50 g of the composite oxide particles represented by the transition metal composition of $Li_{1.03}Ni_{0.82}Co_{0.15}Al_{0.03}$ was placed into this solution, and into the resultant mixture, 16 g of toluene was further added and mixed to prepare a slurry. The slurry was transferred to an evaporator, the flask part was placed in a water bath warmed to 45° C. under reduced pressure, and the ethanol was removed while rotating the flask. Subsequently, the preset temperature of the water bath was set to 60° C., and the toluene was removed. Finally, in order to remove the solvent thoroughly, the powder was transferred to a vacuum dryer, and dried at 100° C. for two hours under reduced pressure to prepare processed powder.

By using the particles coated with this PEDOT/PSS as the coated lithium-nickel composite oxide particles according to Example 2, the following stability test in air, a gelation test, and a battery characteristics test (such as a charge and discharge test, and a cycle test) were performed.

Comparative Example 1

The stability test in air, the gelation test, and the battery characteristics test were performed in the same manner as in Example 1 and Example 2 except for using lithium-nickel composite oxide particles that had not been processed.
<Stability Test in Air>

2.0 g of lithium-nickel composite oxide particles according to each of Example and Comparative Example was each put into a separate glass bottle, the glass bottles were left to stand in a thermostat at a temperature of 30° C. and humidity of 70% for one week, the increased mass was measured as compared to the initial mass, and the change rate per particles mass was calculated. By setting the change rate per particles mass of the lithium-nickel composite oxide particles after the lapse of one week according to Comparative Example 1 to 100, the change rate on every day of each of Examples 1 and 2 and Comparative Example 1 was shown in FIG. 1.

As can be seen from FIG. 1, the coated lithium-nickel composite oxide particles in Example 1, which had been coated with a polyaniline compound, and the coated lithium-nickel composite oxide particles in Example 2, which had been coated with PEDOT/PSS, had a small change rate per mass as compared with that of the lithium-nickel composite oxide particles in Comparative Example 1, which had not been coated with a conductive polymer. From this result, it was confirmed that by coating the particles with a polyaniline compound, or PEDOT/PSS, the permeation of moisture and carbon dioxide in the air can be suppressed.
<Gelation Test>

As to the measurement of change over time of the viscosity of the positive electrode mixture slurry, a positive electrode mixture slurry was prepared in the following order, and then the increase of viscosity and the gelation were observed.

As for the mixing ratio, lithium-nickel composite oxide particles according to Examples and Comparative Example, a conductive auxiliary, a binder, N-methyl-2-pyrrolidone (NMP) were weighed so that the mass ratio of the lithium-nickel composite oxide particles:the conductive auxiliary: the binder:the NMP was 45:2.5:2.5:50, further 1.5% by mass of water was added, then the resultant mixture was stirred by a rotation-revolution mixer, and a positive electrode mixture slurry was obtained. The obtained slurry was stored in an incubator at 25° C., and the changes over time of the viscosity increase and the degree of gelation in Examples 1 and 2 and Comparative Example 1 were confirmed, respectively, by stir mixing the slurry with a spatula. The slurry was stored until obtaining complete gelation.

It took three days for the slurry according to Example 1 and Example 2 to reach complete gelation, and it took one day for the slurry according to Comparative Example 1 to reach complete gelation. From this, in the slurry according to Example 1 and Example 2, by coating the lithium-nickel composite oxide particles with a polyaniline compound, or PEDOT/PSS, the generation of impurities such as lithium hydroxide (LiOH) and lithium carbonate ($Li_2CO_3$) was suppressed, and the slurry gelation and the slurry viscosity increase caused by the reaction with impurities and a binder can be prevented.

Further, in a case when the lithium-nickel composite oxide particles were coated with a fluorine compound, the fluorine compound was dissolved generally into N-methyl-2-pyrrolidone (NMP), therefore, it is considered that even though being coated with the fluorine compound, the coated films are dissolved. Accordingly, different from the coated lithium-nickel composite oxide particles according to Examples, it is considered to be difficult to suppress the generation of impurities when the produced positive electrode is stored. Therefore, the reaction with an electrolytic solution accompanied by gas generation in battery driving, which is caused by the impurities generated during the storage of the positive electrode, is difficult to be suppressed, and an expensive storage facility is required.

<Battery Characteristics Evaluation>

By the following procedures, a non-aqueous electrolyte secondary battery (lithium-ion secondary battery) for evaluation was prepared, and the battery characteristics evaluation was performed.

[Production of Secondary Battery]

As for the battery characteristics evaluation of the lithium-nickel composite oxide particles of the present invention, a coin type battery and a laminate type battery were prepared, and the coin type battery was subjected to a charge and discharge capacity measurement and the laminate cell type battery was subjected to a charge and discharge cycle test and a resistance measurement.

(a) Positive Electrode

Into the obtained lithium-nickel composite oxide particles according to Examples and Comparative Example, an acetylene black as a conductive auxiliary, and polyvinylidene fluoride (PVdF) as a binder were mixed so that the mass ratio of the particles, the acetylene black, and the PVdF was 85:10:5, and the resultant mixture was dissolved into an N-methyl-2-pyrrolidone (NMP) solution to prepare a positive electrode mixture slurry. An aluminum foil was coated with the positive electrode mixture slurry by a comma coater and heated at 100° C. and dried, as a result of which a positive electrode was obtained. A load was applied to the obtained positive electrode through a roll press machine, and a positive electrode sheet in which the positive electrode density had been increased was prepared. This positive electrode sheet was punched out for the evaluation of the coin type battery so as to have the diameter of 9 mm, and also cut out for the evaluation of the laminated cell type battery so as to have the size of 50 mm×30 mm, and each of the punched-out sheet and the cut-out sheet was used as a positive electrode for evaluation.

(b) Negative Electrode

Graphite as a negative electrode active substance and polyvinylidene fluoride (PVdF) as a binder were mixed so that the mass ratio of the graphite and the PVdF was 92.5:7.5, and the resultant mixture was dissolved into an N-methyl-2-pyrrolidone (NMP) solution to obtain a negative electrode mixture paste.

In the same manner as in the positive electrode, with this negative electrode mixture slurry, a copper foil was coated by a comma coater, and heated at 120° C. and dried, as a result of which a negative electrode was obtained. A load was applied to the obtained negative electrode through a roll press machine, and a negative electrode sheet in which the electrode density had been improved was prepared. The obtained negative electrode sheet was punched out for the coin type battery so as to have the diameter of 14 mm, and also cut out for the laminated cell type battery so as to have the size of 54 mm×34 mm, and each of the punched-out sheet and the cut-out sheet was used as a negative electrode for evaluation.

(c) Coin Battery and Laminated Cell Type Battery

The prepared electrode for evaluation was dried at 120° C. for 12 hours in a vacuum dryer. By using this positive electrode, a 2032 type coin battery and a laminated cell type battery were prepared in a glove box in which the dew point was controlled at −80° C. in an argon atmosphere. For the electrolytic solution, ethylene carbonate (EC) using 1M of $LiPF_6$ as a supporting electrolyte and diethyl carbonate (DEC) (manufactured by TOMIYAMA PURE CHEMICAL INDUSTRIES, LTD.), the ratio of which was 3:7, were used, and a glass separator was used as a separator, to prepare each of the batteries for evaluation.

<<Charge and Discharge Test>>

The prepared coin type battery was left to stand for around 24 hours after the assembly, and charged at a current density of 0.2 C rate up to a cut-off voltage of 4.3 V in a thermostat at 25° C. after the open circuit voltage (OCV) was stabilized. After one hour of rest, a charge and discharge test for measuring the discharge capacity was performed when the battery was discharged up to a cut-off voltage of 3.0 V.

The initial discharge capacity of the coin type battery according to Example 1 was 198.99 mAh/g, and the initial discharge capacity of the coin type battery according to Example 2 was 191.91 mAh/g, but the initial discharge capacity of the coin type battery according to Comparative Example 1 was 191.93 mAh/g.

<<Cycle Test>>

In the same manner as in the coin type battery, the prepared laminate type battery was left to stand for around 24 hours after the assembly, and charged at a current density of 0.2 C rate up to a cut-off voltage of 4.1 V in a thermostat at 25° C. after the open circuit voltage was stabilized. After one hour of rest, the battery was discharged up to a cut-off voltage of 3.0 V. Next, this battery was subjected to a cycle test of repeating a cycle of 4.1 V-CC charge and 3.0 V-CC discharge at a current density of 2.0 C rate in a thermostat at 60° C., and a cycle test of confirming the capacity retention rate after 500 cycles was performed. The results of the cycle test are shown in FIG. 2, the impedance test results before the cycle test are shown in FIG. 3, and the impedance test results after the cycle test of 500 cycles are shown in FIG. 4.

Figure 2:
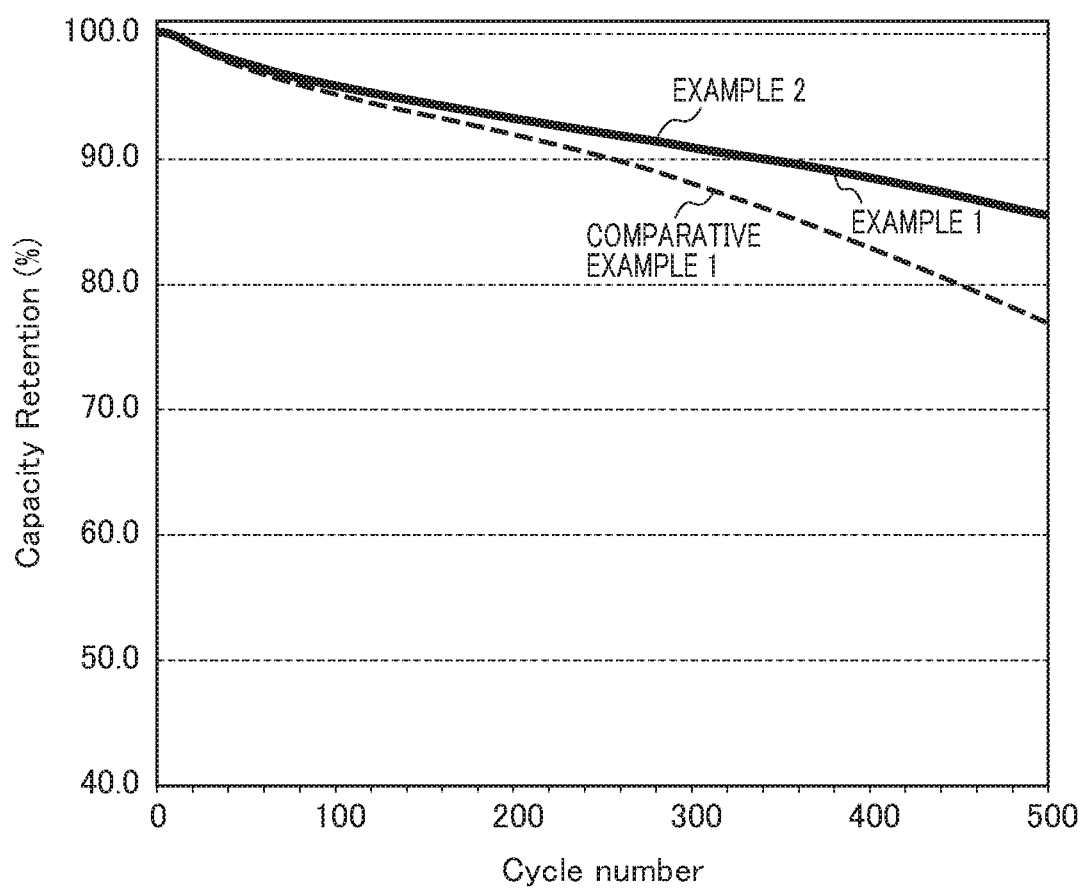
FIG. 2 shows a capacity change rate from a cycle test in Examples and Comparative Example.
Figure 3:
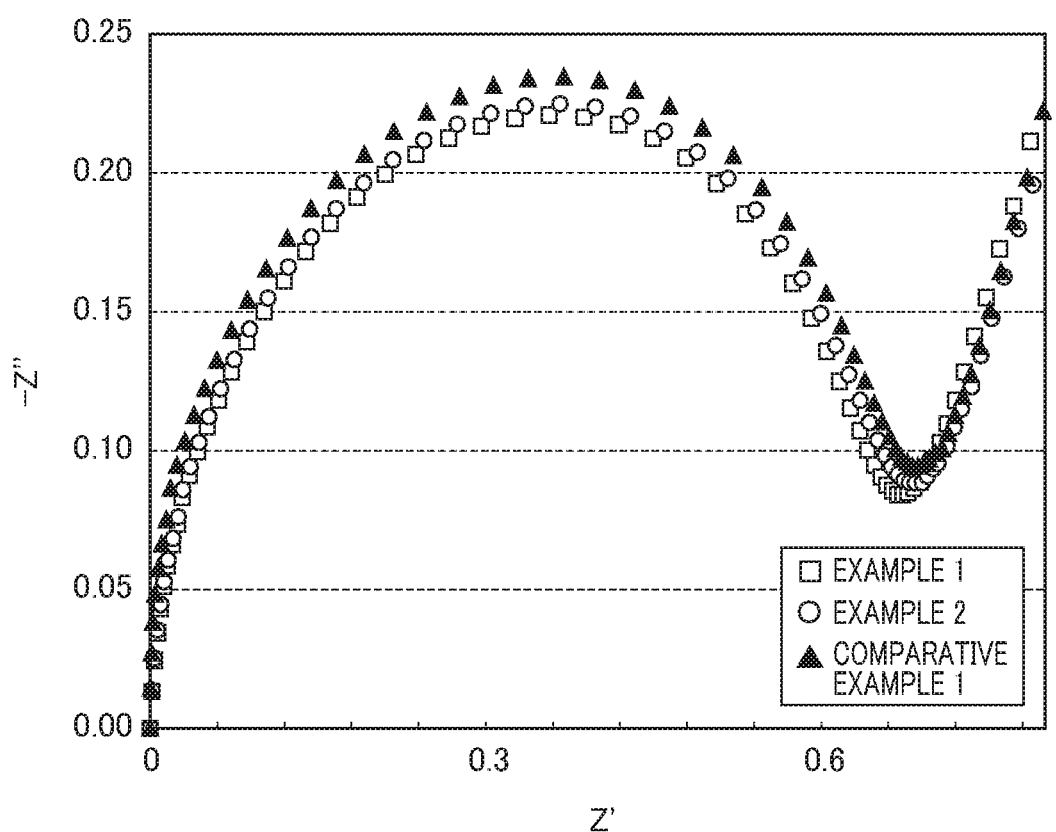
FIG. 3 shows a Cole-Cole plot from an impedance test before the cycle test.
Figure 4:
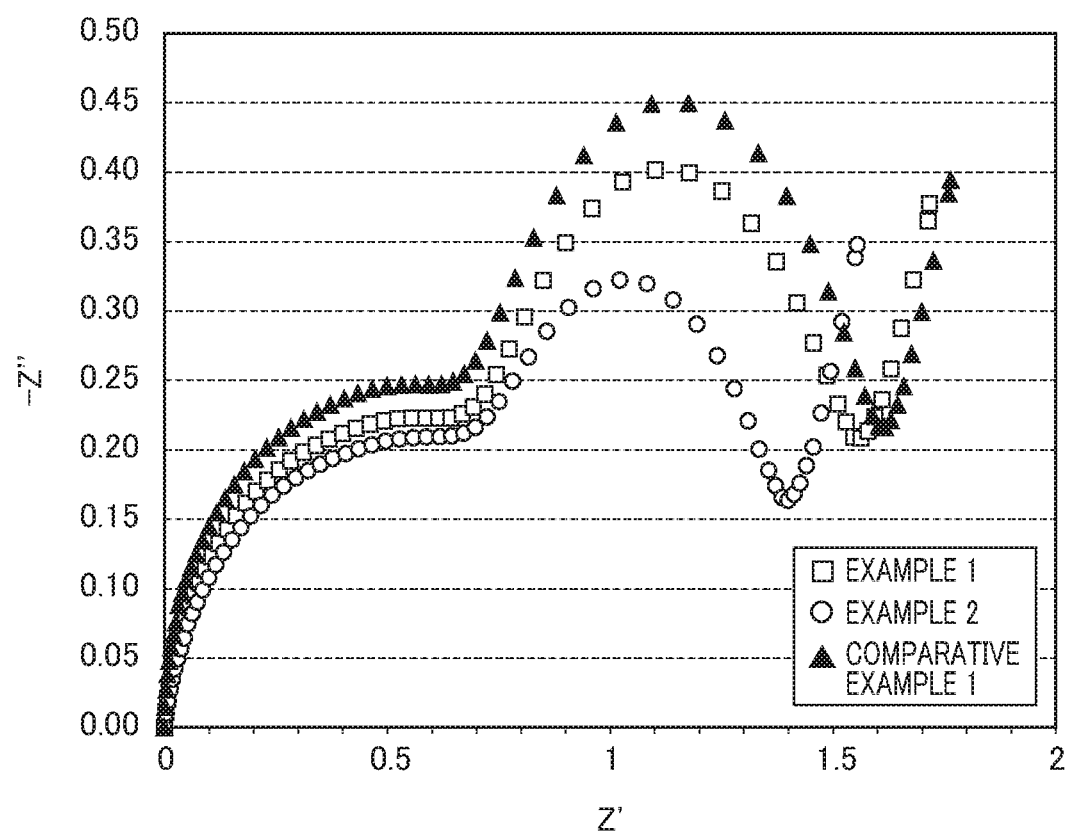
FIG. 4 shows a Cole-Cole plot from an impedance test after the cycle test of 500 cycles.

From FIGS. 2 and 3, in the capacity retention before the cycle test and the Cole-Cole plot in impedance, the laminate batteries according to Examples and Comparative Example were approximately equal to each other, but from FIGS. 2 and 4, in the capacity retention after the impedance test after a cycle test of 500 cycles, the capacity retention of the laminate type battery according to Example 1 and Example 2 was retained higher than that of the laminate type battery according to Comparative Example 1. From this, it was confirmed that because the lithium-nickel composite oxide particles used for the laminate battery of Example is coated with a polyaniline compound, or PEDOT/PSS, the decreased amount of the capacity retention is small also when used in a long cycle, therefore, the lithium-nickel composite oxide particles have higher capacity retention rate and are excellent.

The invention claimed is:

1. A method for producing coated lithium-nickel composite oxide particles,
   wherein the coated lithium-nickel composite oxide particles comprise cores of nickel-based lithium-nickel composite oxide particles and shells of an electrically conductive polymer;
   wherein the method comprising:
   preparing a resin solution for coating by dissolving the electrically conductive polymer into a good solvent that dissolves the electrically conductive polymer;
   adding a poor solvent that does not dissolve a resin for coating and has a boiling point higher than that of the good solvent into the resin solution for coating;
   adding the lithium-nickel composite oxide particles into the resin solution for coating to prepare a slurry;
   and
   removing the good solvent and the poor solvent sequentially from the slurry, so as to form shells on cores of the lithium-nickel composite oxide particles.

* * * * *